March 24, 1964 A. W. ANDERSON 3,125,841

PACKAGE BOXING MECHANISM

Filed May 29, 1961 10 Sheets-Sheet 1

INVENTOR.
ANDREW W. ANDERSON
BY Luther W. Hawley
ATTORNEY

March 24, 1964

A. W. ANDERSON 3,125,841

PACKAGE BOXING MECHANISM

Filed May 29, 1961

10 Sheets-Sheet 2

INVENTOR.
ANDREW W. ANDERSON

BY Luther W. Hawley
ATTORNEY

March 24, 1964 A. W. ANDERSON 3,125,841

PACKAGE BOXING MECHANISM

Filed May 29, 1961 10 Sheets-Sheet 3

INVENTOR.
ANDREW W. ANDERSON
BY Luther W. Hawley
ATTORNEY

March 24, 1964 A. W. ANDERSON 3,125,841

PACKAGE BOXING MECHANISM

Filed May 29, 1961 10 Sheets-Sheet 4

INVENTOR.
ANDREW W. ANDERSON
BY Luther W. Hawley
ATTORNEY

March 24, 1964 A. W. ANDERSON 3,125,841
PACKAGE BOXING MECHANISM
Filed May 29, 1961 10 Sheets-Sheet 5

INVENTOR.
ANDREW W. ANDERSON
BY
[signature]
ATTORNEY

INVENTOR.
ANDREW W. ANDERSON
BY Luther W. Hawley
ATTORNEY

March 24, 1964 A. W. ANDERSON 3,125,841

PACKAGE BOXING MECHANISM

Filed May 29, 1961 10 Sheets-Sheet 7

INVENTOR.
ANDREW W. ANDERSON

BY Luther W. Hawley
ATTORNEY

March 24, 1964 A. W. ANDERSON 3,125,841

PACKAGE BOXING MECHANISM

Filed May 29, 1961 10 Sheets-Sheet 9

INVENTOR.
ANDREW W. ANDERSON

BY Luther W. Hawley
ATTORNEY

March 24, 1964 A. W. ANDERSON 3,125,841

PACKAGE BOXING MECHANISM

Filed May 29, 1961 10 Sheets-Sheet 10

INVENTOR.
ANDREW W. ANDERSON

BY Luther W. Hawley

ATTORNEY

United States Patent Office 3,125,841
Patented Mar. 24, 1964

3,125,841
PACKAGE BOXING MECHANISM

Andrew W. Anderson, West Caldwell, N.J., assignor to Scandia Packaging Machinery Company, North Arlington, N.J., a corporation of New Jersey
Filed May 29, 1961, Ser. No. 113,231
7 Claims. (Cl. 53—228)

This invention relates to a machine for boxing a plurality of stacked packages.

More particularly stated, the invention relates to a machine for bending and folding carton blanks and for feeding stacked packages into the blanks in such a manner that the contents will not be distorted or damaged.

Cigarette cartons or boxes are made of relatively stiff cardboard and the packages in usual machines of this character are pushed endwise into the cardboard blank and the pressure of the packages against the blank is used to promote the folding of the blank around the packages. This bends or deforms the ends of the cigarettes in the packages.

This invention has for its salient object to provide a machine for boxing a plurality of packages so constructed and arranged that the carton or box blanks will be bent on the fold lines prior to inserting the packages therein, thus preventing distortion or damage to the contents of the packages being assembled and boxed.

Another object of the invention is to provide improved means for facilitating the insertion of the advance end of the box blank in the blank feeding mechanism.

Another object of the invention is to provide blank bending means so constructed and arranged that the blank and the tabs on the blank will be bent on the fold lines in such a manner that pressure is not exerted on the contents of the packages.

Further details of the invention will appear from the following specification taken in connection with the drawings which form a part of this application, and in which FIG. 1 is a front elevation of a boxing machine constructed in accordance with the invention;

Figures 7, 7A:
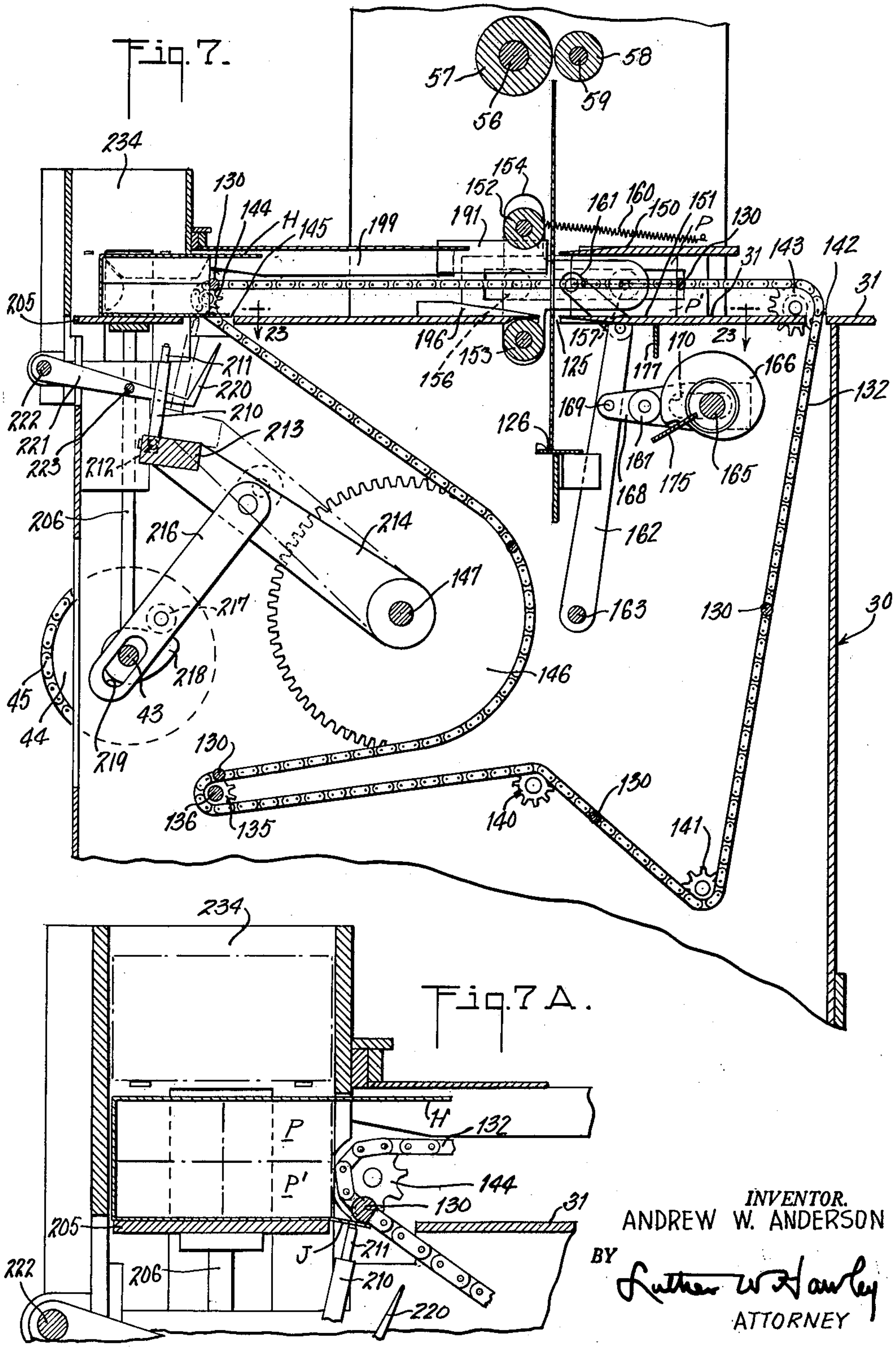
FIG. 7 is a sectional elevation taken on line 7—7 of FIG. 5, looking in the direction of the arrows.
FIG. 7A is an enlarged sectional elevation of the structure shown in the upper left hand corner of FIG. 7 showing the parts in a different position of movement.
Figure 22:
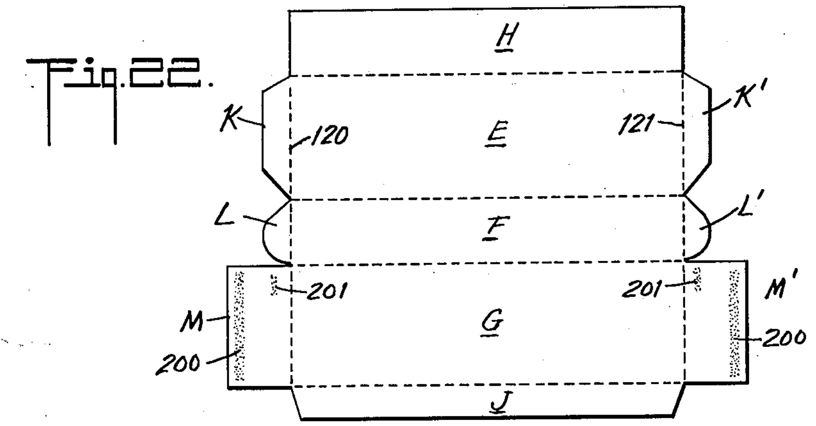
Figure 23:
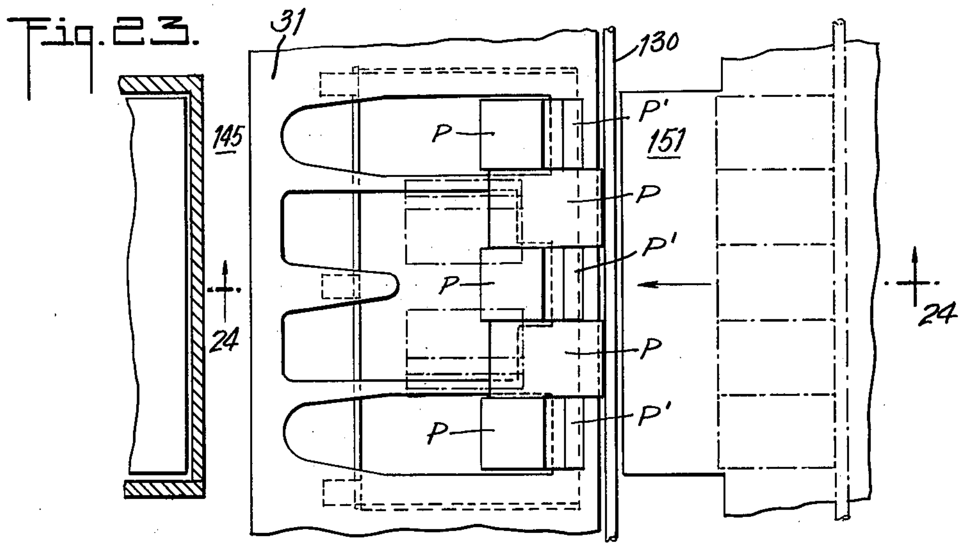
Figure 24:
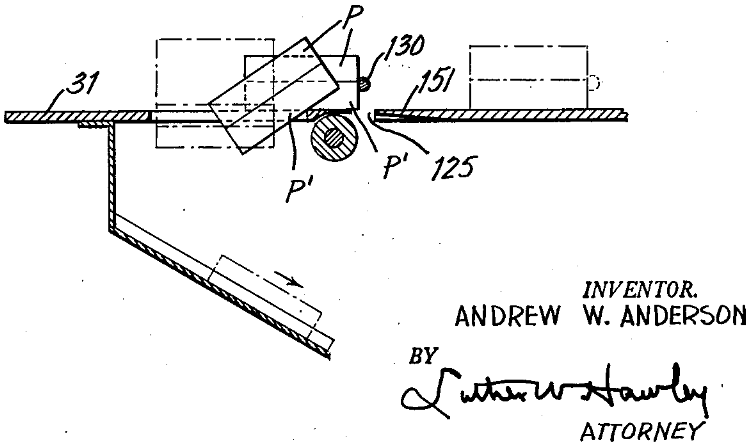

FIGS. 17 to 21 inclusive are prospective elevations showing the successive steps in the folding of the blank around the packages enclosed therein forming a closed carton;

FIG. 22 is a plan view of the carton blank;

FIG. 23 is a plan view of a portion of FIG. 7 showing openings in the table across which the carton is fed and showing particularly openings through which packages can be removed from the machine in the event that no carton has been fed; and FIG. 24 is a sectional elevational taken substantially on line 24—24 of FIG. 23, looking in the direction of the arrows.

The invention, briefly described, comprises a machine for feeding box or carton blanks into the path of movement of packages to be boxed, and bending the blank on the fold lines to complete the carton in such a manner that pressure is not exerted on the contents of the packages during the folding of the carton and sealing the carton around the packages to form a closed box.

Further details of the invention will appear from the following description.

Figure 1:
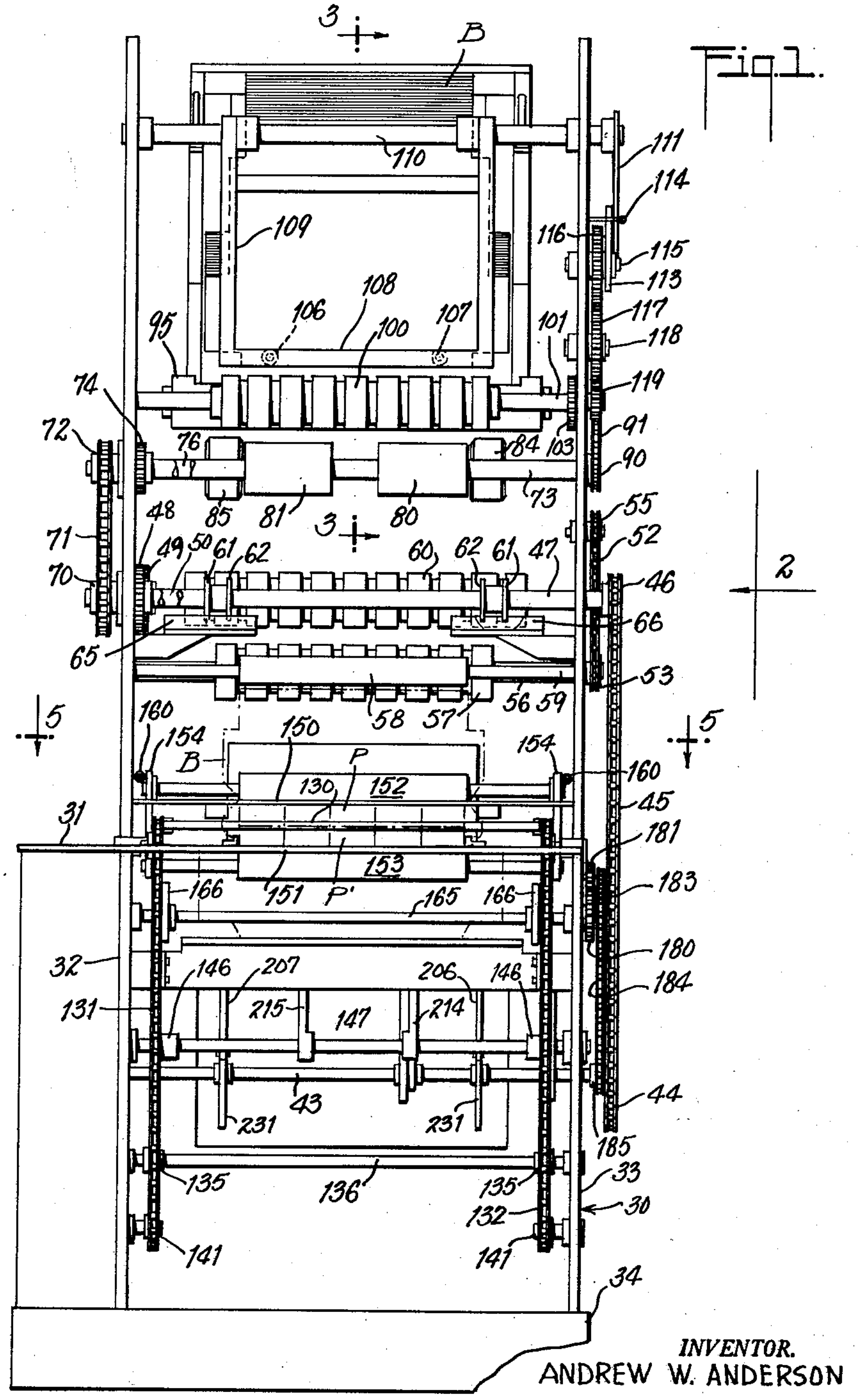
Figure 2:
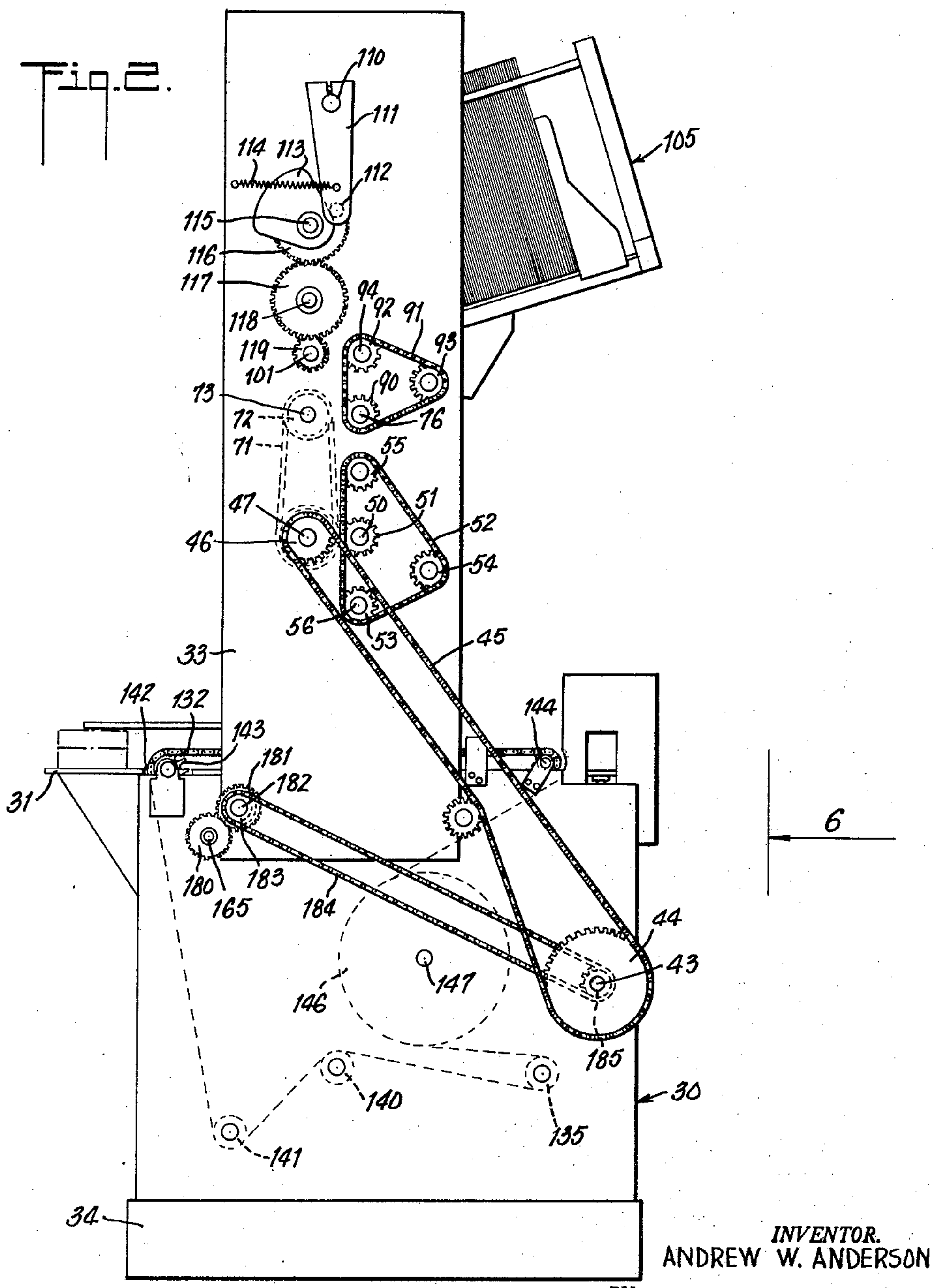
FIG. 2 is a side elevation looking in the direction of the arrow 2 on FIG. 1.
Figure 5:
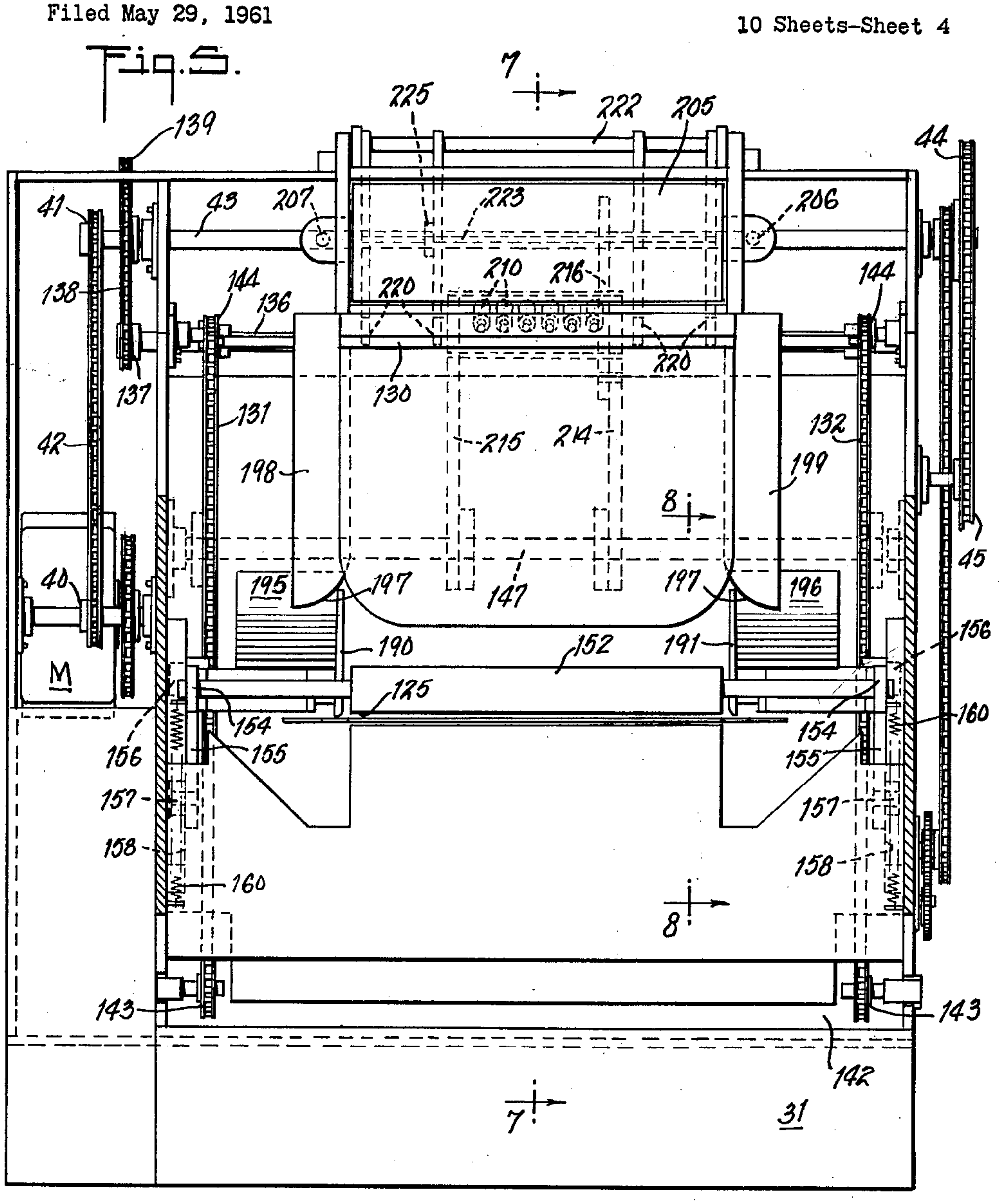
FIG. 5 is an enlarged sectional elevation taken on line 5—5 of FIG. 1, looking in the direction of the arrows.
Figure 6:
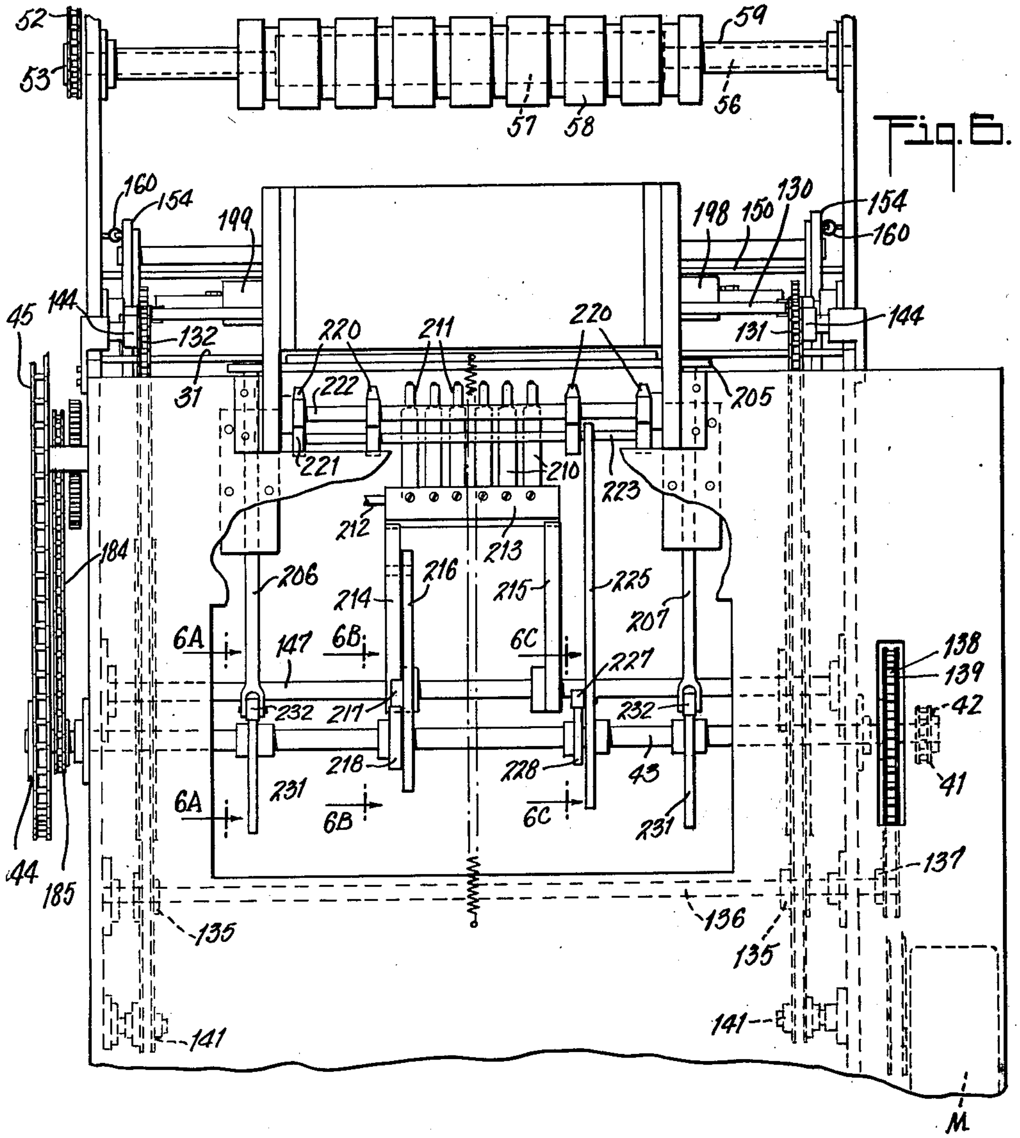
FIG. 6 is a side elevation looking in the direction of the arrow 6 on FIG. 2.
Figure 6A:
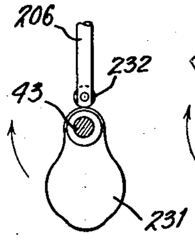
FIGS. 6A, 6B and 6C are detail sectional elevations taken substantially on line 6A—6A, 6B—6B and 6C—6C of FIG. 6, looking in the direction of the arrows.
Figure 6B:
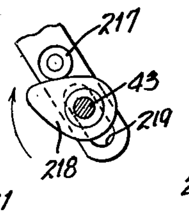
Figure 6C:
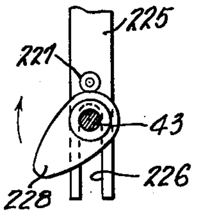

Referring particularly to FIGS. 1, 2 and 5, the apparatus comprises a casing 30 having a table or platform 31 at the top thereof and having side frames 32 and 33 which extend from a base 34 up through the table 31, these side frame members supporting the various shafts for the operating mechanism.

FIG. 5 illustrates a motor M which is connected by sprocket wheels 40 and 41 and a chain 42 to drive a shaft 43. This shaft has mounted thereon a sprocket wheel 44 which, through a chain 45, drives a sprocket wheel 46 on a shaft 47. Shaft 47 has mounted thereon a spur gear 48, which meshes with a gear 49 mounted on a shaft 50. Shaft 50 has secured thereto a sprocket wheel 51 which drives a sprocket chain 52. The chain 52 extends around sprocket wheels 53, 54 and 55. The sprocket wheels 54 and 55 are mounted on stub shafts but the sprocket wheel 53 is mounted on a shaft 56 which carries a feed roller 57 which coacts with a roller 58 mounted on a shaft 59 to feed the blank downwardly.

The shaft 50 has mounted thereon a roller 60 and the shaft 47 carries two sets of disks 61 and 62 which rotate through adhesive carried by vats 65 and 66. The disks 61 and 62 engage portions of the blank flaps in the manner hereinafter described to apply adhesive thereto.

The shaft 47 has mounted on one end thereof a sprocket wheel 70, which is connected by a chain 71 to a sprocket wheel 72 mounted on a shaft 73. This shaft has a spur gear 74 which meshes with a gear 75 on a shaft 76 (see FIG. 4).

Shaft 73 has mounted thereon a pair of spaced feed rollers 80 and 81 which coact with feed rollers 82 and 83 mounted on the shaft 76. The shaft 76 also has secured thereto a pair of rollers 84 and 85, which are larger in diameter than the feed rollers 82 and 83 and have beveled edges 86 and 87 on the ends adjacent the feed rollers 82 and 83.

Attention is now directed to FIG. 22, which shows the blank B of the carton which is fed and folded around the contents in the machine which forms the basis of this application. The blank comprises body portions E, F and G, end tabs H and J, and side tabs K, L and M on one side of the blank, and K', L' and M' on the other side of the blank.

Shaft 76 has mounted thereon a sprocket wheel 90, which drives a chain 91 around a pair of sprocket wheels 92 and 93. The sprocket wheel 93 is an idler but the sprocket wheel 92 is mounted on a stub shaft 94 on which is mounted one end of a feed roller 95, the other end of the roller 95 being mounted on a second stub shaft. Feed roller 95 has extending longitudinally thereof an inwardly extending slot 96 which, in a manner about to be described, receives the advance end of the carton blank and upon rotation in the direction of the arrow shown in FIG. 3, to the position shown in FIG. 3A, carries the advance end of the blank into the nip or point of contact of the feed roller 95 with a coacting feed roller 100 mounted on a shaft 101. The roller 100 is driven by spur gears 102 and 103 from the stub shafts of the feed roller 95.

The box blanks B, as shown in FIG. 2, are carried by an inclined hopper 105, and the advance blank or bottom blank in the hopper is engaged by suction cups 106 and 107 mounted on a cross bar 108 carried by a frame 109 mounted on a shaft 110. As shown in FIG. 2, the shaft 110 has secured to the outer end thereof, an arm 111 having at the bottom thereof a stud or roller 112 which engages a cam 113, being held in engagement with the cam by a spring 114 connected to the arm 111. The cam 113 is mounted on a stub shaft 115 on which is also secured a spur gear 116 which meshes with a spur gear 117 mounted on a stub shaft 118. The spur gear 117 is driven by a gear 119 carried by the shaft 101.

Figures 3, 3A, 4:
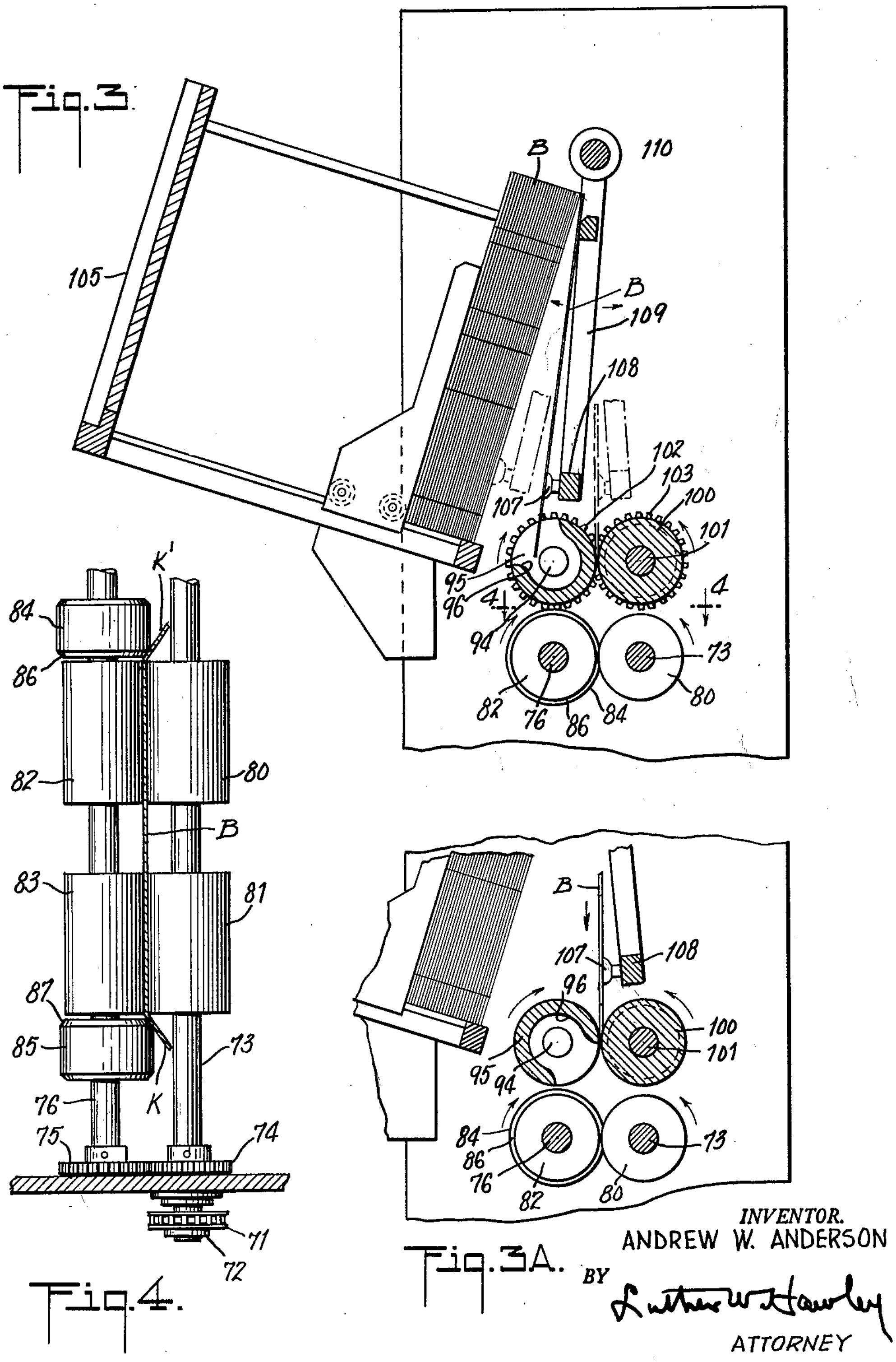
FIG. 3 is an enlarged sectional elevation on line 3—3 of FIG. 1, looking in the direction of the arrows.
FIG. 3A is a view similar to FIG. 3 but showing the feed rollers in the position taken when the blank is moving into the pinch or gripping position between the rollers.
FIG. 4 is a sectional elevation taken on line 4—4 of FIG. 3, looking in the direction of the arrows.

It will be understood that the suction cups 106 and 107 carried by the cross bar 108 can be connected to a source of suction and that the suction can be cut off after the end blank has been fed to the position shown in FIG. 3A.

After the blank has been fed into feeding position between the rollers 95 and 100, it is fed downwardly between the rollers 80, 81 and 82, 83 and as it passes between these rollers the tabs K, L and M and K', L' and M' will be bent on the fold lines 120 and 121 in the manner shown in FIG. 4. From the feed rollers 80, 82 and 81, 83 the blank passes downwardly between the rollers 60 and adhesive applying disks 61 and 62, and then between rollers 57 and coacting roller 58 mounted on shaft 59.

The blank then passes through a slot 125 in the table 31 and the lower edge of the blank rests on a stop 126.

*Blank Folding Mechanism*

The packages are fed across the table 31 and into the discharge position by cross bars 130 carried at spaced intervals by a pair of chains 131 and 132, attention being directed to FIG. 7. The chains 131 and 132 are driven by sprocket wheels 135 carried by a shaft 136 which is driven from sprocket wheel 137 by a chain 138 which engages a sprocket wheel 139 mounted on the shaft 43.

The chains 131 and 132 are guided around idler sprocket wheels 140 and 141 and pass upwardly through a slot 142 in the table 31 and across the top of the table and around sprocket wheels 143 and 144 downwardly through a slot 145 in the table, and thence around sprocket wheels 146 mounted on a shaft 147.

Figure 8:
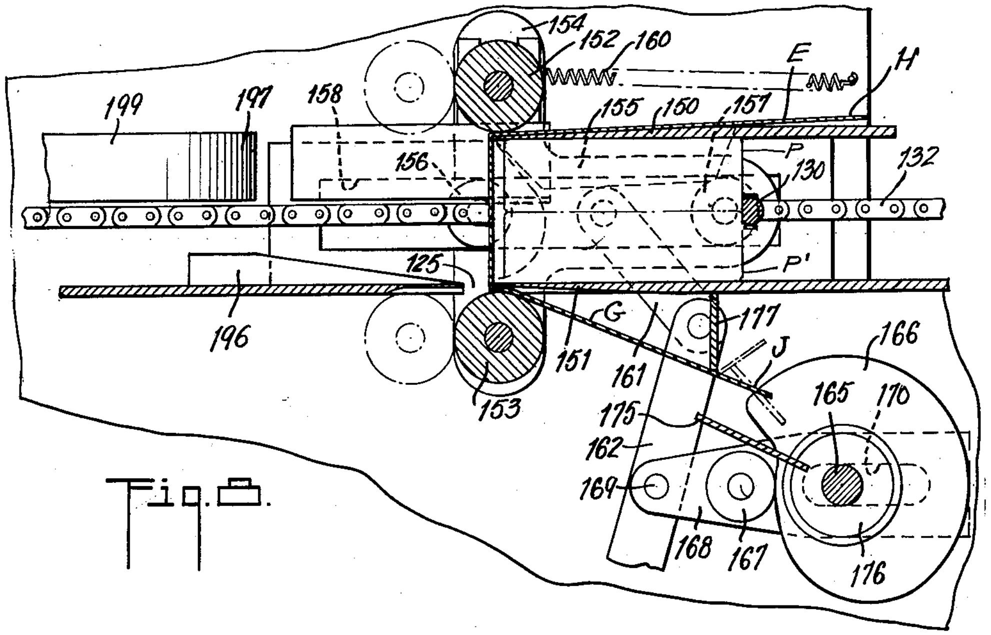
FIG. 8 is a sectional elevation, on an enlarged scale, taken substantially on line 8—8 of FIG. 5, looking in the direction of the arrows.
Figure 9:
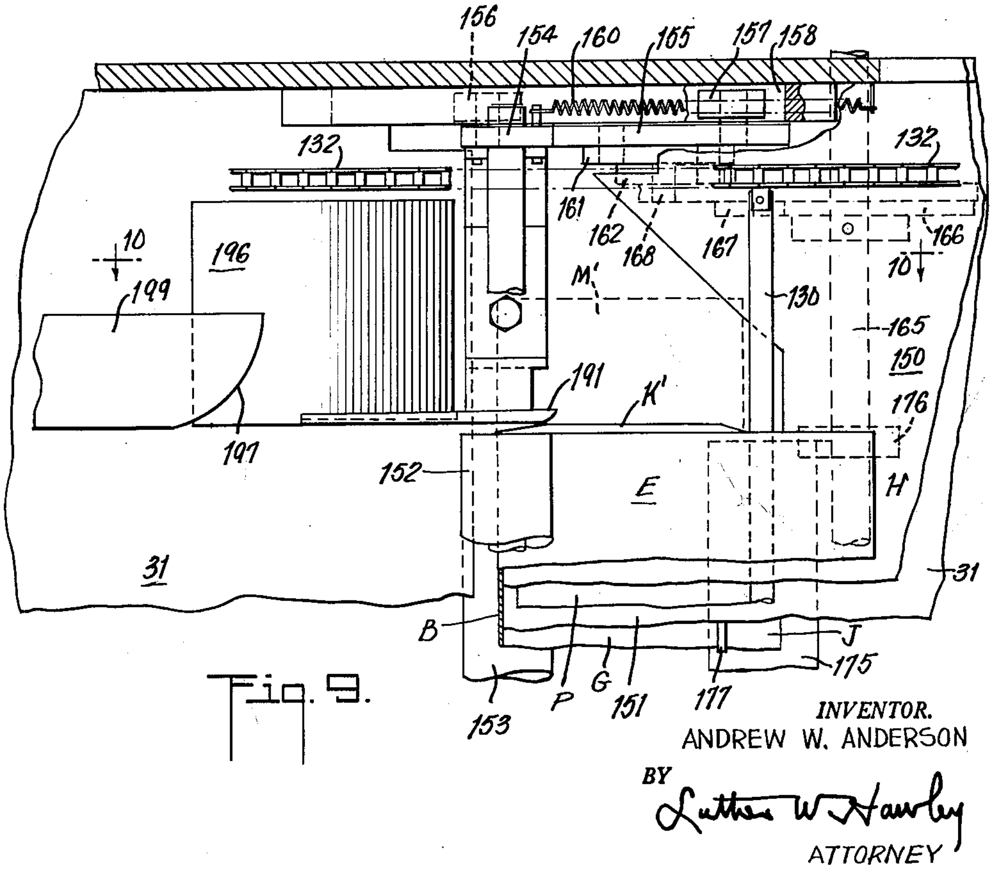
FIG. 9 is a plan view of the structure shown in FIG. 8.

The packages to be boxed are fed along the table 31 by the bars 130, but before they engage the blank the blank is folded over a pair of forms 150 and 151 in the manner shown in FIG. 8. The form 151 forms a part of the platform 31.

In order to fold the blank over the forms 150 and 151 in the manner shown in FIG. 8, the blank is engaged by a pair of rollers 152 and 153 mounted on a bar 154 having an extension 155. The bar 154 has secured thereto rollers 156 and the extension 155 has secured thereto rollers 157, these rollers being mounted in a guide 158. The bar 154 is normally moved to the right in FIG. 8 by a spring 160.

The extension 155 is pivotally connected by a link 161 to an arm 162 which is mounted on a fixed pivot 163. The arm 162 is controlled and actuated in the following manner. A shaft 165 has mounted thereon a cam 166 which engages a roller 167 carried by a link 168 pivoted at 169 to the arm 162. The other end of the link 168 is bifurcated or slotted, as shown at 170, and the shaft 165 extends through the slot or bifurcation 170. It will be obvious that as the shaft 165 is rotated in the manner hereinafter described, the cam 166, by its engagement with the roller 167, will oscillate the arm 162 and through the link 161 will reciprocate the carriage formed by the bar 154 and extension 155, thus causing the rollers 152 and 153 to move into the position shown in FIG. 8 and fold the portions E and G of the blank over the forms 150 and 151. This is accomplished before the stacked packages to be boxed are fed by a cross bar 130 along the table 31 and into the folded carton. Thus, the pressure of the packages is not utilized to fold the carton beneath and above the packages.

When the carton has been folded in the manner shown in FIG. 8, the end tab J extends downwardly and is engaged by a bar 175 carried by a roller 176 mounted on the shaft 165. The tab J at this time is disposed beneath a fixed bar 177 extending downwardly from the platform 31. As the bar 175 engages the tab J, it will bend upwardly, as shown at FIG. 8, around the bottom of the fixed bar 177.

The shaft 165 has mounted thereon a spur gear 180, which meshes with a gear 181 mounted on a shaft 182, which has also mounted thereon a sprocket wheel 183 driven by a chain 184 from a sprocket wheel 185 mounted on the shaft 43.

After the blank portions E, F and G have been folded along the fold lines between portions E and F and F and G in the manner shown in FIG. 8, one of the cross bars 130 will feed the packages P and P', which have been assembled in two rows, forwardly along with the folded carton blank. During this movement, the tabs L and L' will be engaged and folded by folding bars 190 and 191 disposed above the platform 31 and in a position to be engaged by the tabs. The bars 190 and 191 are mounted on the carriage on which are mounted the rollers 152 and 153 and, thus, as the rollers move from the position shown in dotted lines in FIG. 8 to the full line position, the folding bars 190 and 191 will engage the tabs L and L' and also the tabs K and K', folding these tabs downwardly against the sides of the packages enclosed by the carton.

As the carton moves along the platform, the end tabs M and M' will ride up on inclined ledges or guides 195 and 196 until they engage the rounded ends 197 on fixed bars 198 and 199, which fold the flaps M and M' over the folded flaps K and L and K' and L'.

The disks 61 and 62 carried by the shaft 47 will place on the insides of the flaps M and M', lines of adhesive 200, 200 and 201, 201. The short lines 201, 201 engage the flaps L and L' and the long lines of adhesive 200, 200 engage and secure the flaps K and K'. The various folding operations just described can be followed by referring particularly to FIGS. 5, 6, 9, 10 to 13 inclusive. The successive folds are also shown in FIGS. 17 to 21 inclusive.

The cartons with the contents positioned therein are fed by the cross bars 130 through the folding mechanism just described and to a position above an elevator platform 205 mounted on the top of plungers 206 and 207, attention being directed particularly to FIGS. 6, 6A, 6B, 7, 7A, 14, 15 and 16. When the carton with its contents has been fed to the position shown in FIG. 7A, the tab J is engaged by adhesive applying means, shown particularly in FIGS. 6, 7 and 7A. This means consists of a plurality of cylinders 210 having spring actuated plungers 211 and supplied with adhesive through a pipe 212. The cylinders 210 are mounted on a bar 213 carried by arms 214 and 215 pivoted on the shaft 147. One of the arms 214 has pivoted thereto a link 216 having a roller 217 engaged by a cam 218. The link 216 is slotted, as shown at 219, and the shaft 43 extends through the slot. As the shaft 43 is rotated, the cam 218, coacting with the roller 217, will reciprocate the link 216, thus causing the adhesive cylinders 210 to be moved from the position shown in FIG. 7 to the position shown in FIG. 7A. As the plungers in the cylinders engage the under surface of the flap J, one of the cross bars 130 will be positioned above the flap and the pressure of the plunger in the cylinder against the flap will cause adhesive to be deposited on the outer surface of the flap. Thereafter, the adhesive applying means is retracted to the position shown in full lines in FIG. 7.

In order to carry out the objects of the invention, namely, to prevent pressure during the folding operations from damaging the contents of the carton, the two final folds, namely, of the flaps J and H, are performed in the following manner, attention being directed particularly to FIGS. 6, 6A, 6B, 6C, 7, 14, 15 and 16. The flaps J are folded upwardly by means of a plurality of fingers 220 which are mounted in spaced relation on arms 221 pivoted on a spindle 222. A rod 223 extends through the arms 221 and has connected thereto and extending downwardly therefrom, a link or pitman 225. The pitman is bifurcated at its lower end at 226 and the shaft 43 extends through the bifurcation or forked end of the pitman. A roller 227 on the pitman 225 is engaged by a cam 228 mounted on the shaft 43. As the shaft is rotated, the pitman 225 is reciprocated and raises and lowers the arms 221 and the tapered fingers 220 extending upwardly from the ends of the arms and disposed at an angle thereto. It will be noted from the showing in FIG. 6 that the arms 221 and the fingers 220 are disposed at the sides and beyond the bar 213 and the adhesive applying means carried thereby.

Figures 14, 15, 16:
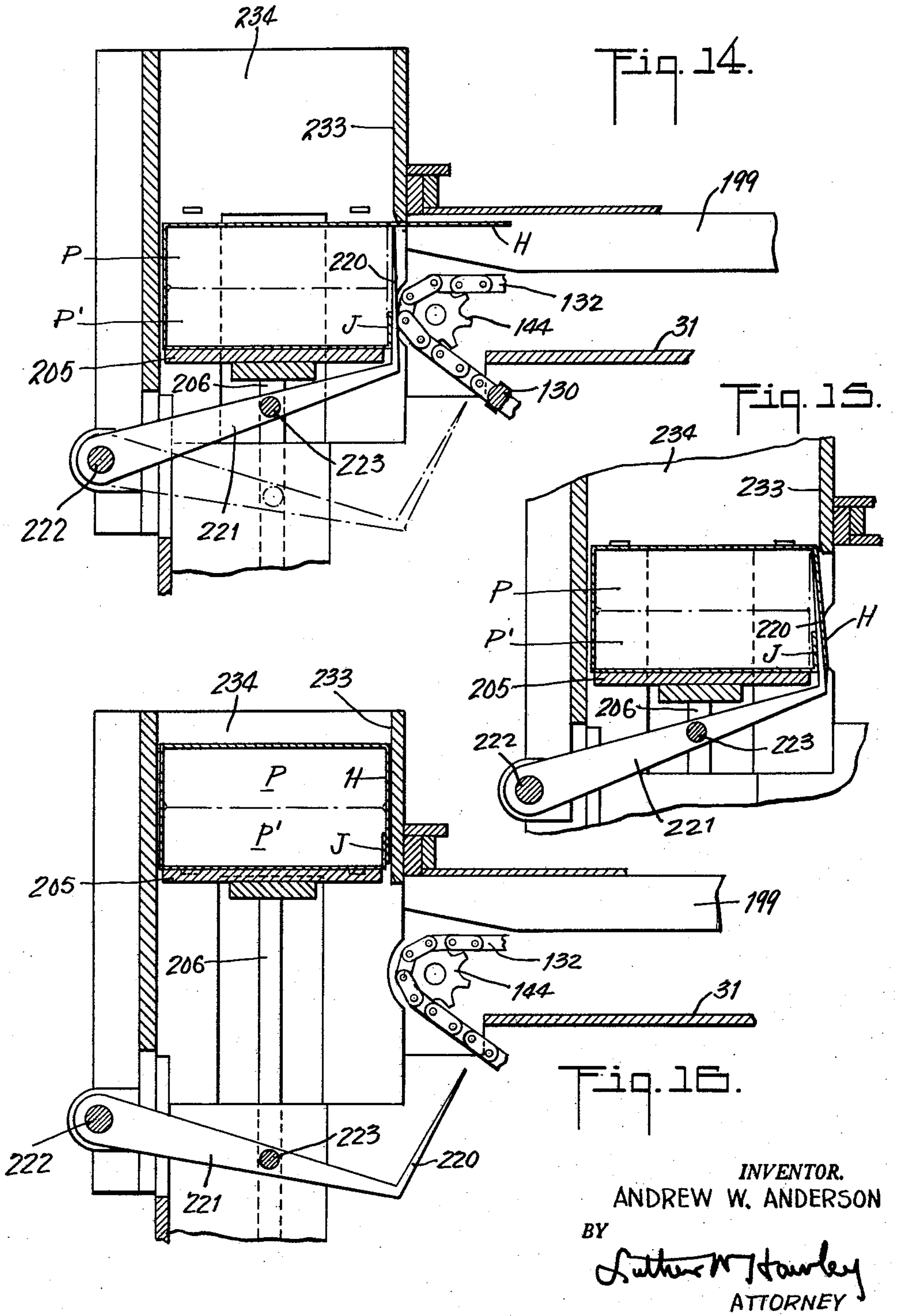
FIGS. 14, 15 and 16 are sectional elevations showing successive stages of the final folding operation of the blank and the ejection of the completed carton from the apparatus.

After the adhesive has been applied to the flaps J, the arms and fingers are raised to the position shown in FIG. 14, from which it will be seen that the flap J has been folded upwardly. Thereafter, the plungers 206 and 207 which engage the elevator platform are actuated by means of cams 231 mounted on the shaft 43, the cams engaging rollers 232 on the lower ends of the plunger rods 206 and 207. As the carton and the contents thereof are raised, the flap H is folded downwardly by the wall 233 of the vertical channel 234 into which the cartons are raised by the plungers. The flap will be folded against the outsides of the fingers 220, but as the carton moves upwardly it will fold against the flap J, which has already been folded, and will be secured thereto by the adhesive applied to the flap J in the manner shown in FIG. 7A.

Figures 10, 11, 12, 13, 17, 18, 19, 20, 21:
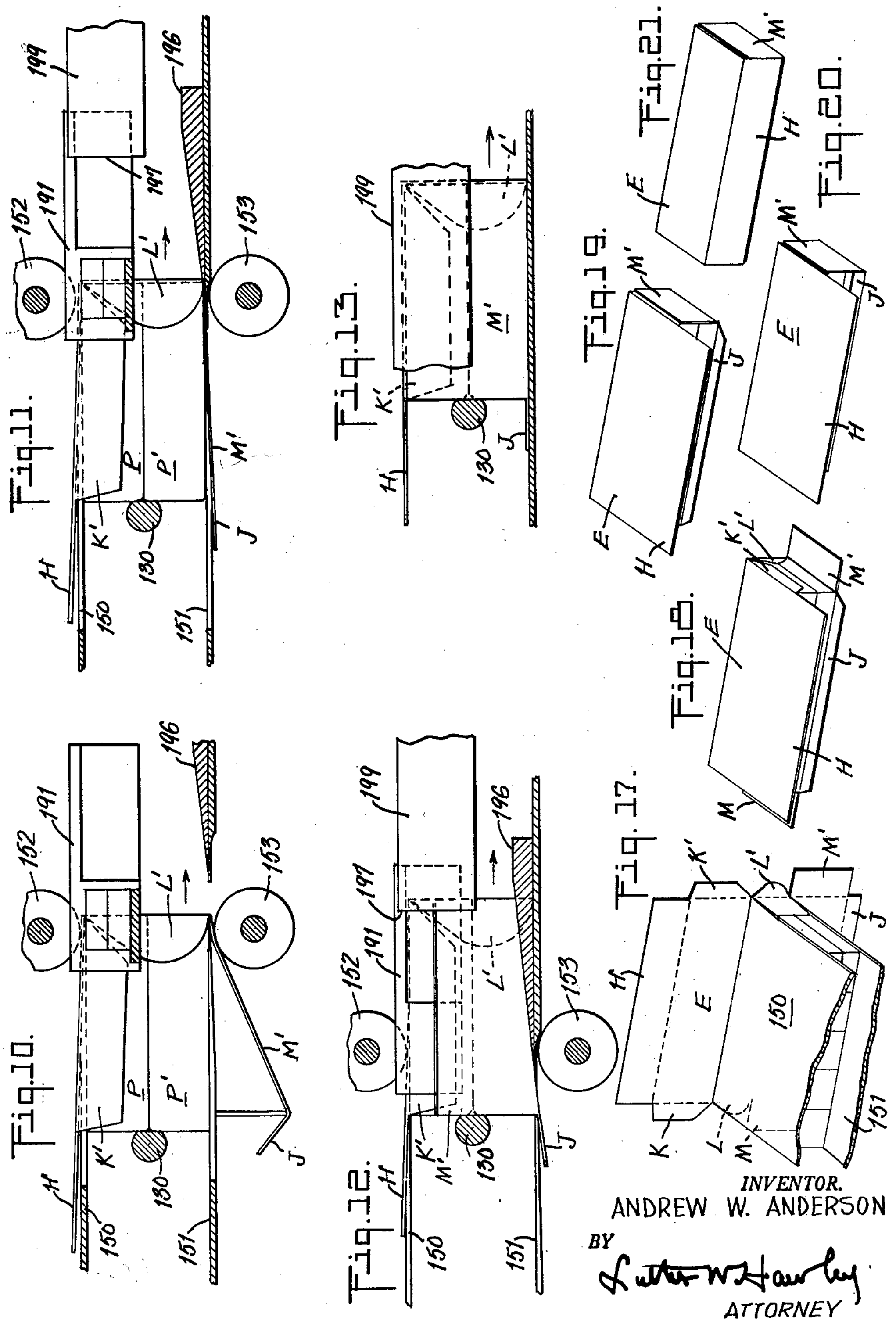
FIG. 10 is a sectional elevation taken on line 10—10 of FIG. 9, looking in the direction of the arrows.
FIGS. 11, 12 and 13 are sectional elevations similar to FIG. 10 but showing successive stages in the passage of the carton through the bending and folding means.

Referring to FIGS. 17 to 21, the carton blank is shown in the position in which it is engaged by the packages P or, in other words, in the position shown in FIG. 7. The next folding position of the blank is shown in FIG. 18 in which the blank has been folded around the top and bottom of the stacks of packages to be wrapped. This figure corresponds to the position shown in FIGS. 8, 9, 10 and 11. FIG 19 shows the position of the blank corresponding to the showings in FIGS. 12 and 13. FIG. 20 shows the position as illustrated in FIG. 14 and FIG. 21 shows the completed, folded cartons as illustrated in FIG. 16.

FIGS. 23 and 24 illustrate how the packages drop through openings in the platform or table 31 when no blank has been fed. As shown, the three sets of packages P and P′ at the ends and in the center of the rows drop directly through openings in line therewith. The other two sets P and P′ then drop through the larger central opening in the platform after the set of packages first mentioned have dropped, the other two sets first tilting downwardly sidewise.

From the foregoing specification outlining the folding of the carton around the contents being boxed, it will be seen that the folding is accomplished without exerting any pressure on the contents of the packages being boxed.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a package boxing machine, a slotted table, means for feeding a box blank partially through the slot in the table so that part of the blank is disposed above and part of the blank is disposed below the table, means for feeding packages to be boxed across the table substantially at right angles to the blank, and rollers movable independently of the feeding movement of the packages and operatable prior to the engagement of the packages with the blank for bending the blank along fold lines to enclose the advance end of the packages and to position the blank beneath and above the packages.

2. In a package boxing machine, a slotted table, means for feeding a box blank having side flaps and end flaps through the table slot and for supporting the blank with a portion above and a portion below the table, means for feeding packages along the table to enclose the packages, rollers above and below and disposed across the path of travel of the packages and operatable prior to the engagement of the packages with the blank for bending the blank along fold lines to enclose the advance end of the packages and to position the blank beneath and above the packages, and means engageable with the side flaps of the blank as the blank and packages are fed along the table to fold and secure the side flaps against the packages.

3. In a package boxing machine, a slotted table, means for feeding a box blank having side flaps and end flaps through the table slot and for supporting the blank with a portion above and a portion below the table, means for feeding packages along the table to enclose the packages, substantially horizontal, flat forms above and below the path of travel of the packages, means operatable prior to the engagement of the packages with the blank for bending the blank along fold lines to enclose the advance end of the packages and to position the blank over said forms and beneath and above the packages, means engageable with the side flaps of the blank as the blank and packages are fed along the table to fold and secure the side flaps against the packages, and means subsequently engageable with the end flaps for folding and securing the end flaps of the blank around the packages.

4. In a package boxing machine, a slotted table, means for feeding a box blank having side flaps and end flaps through the table slot with a portion of the blank below and a portion of the blank disposed above the table, means for feeding packages along said table at right angles to the blank, substantially flat, horizontal forms above and below the path of movement of the packages, and means movable in paths substantially parallel to the path of travel of the packages engageable with the blank for folding the blank over said forms prior to engagement of the blank by the packages.

5. In a package boxing machine, a slotted table, means for feeding a box blank having side flaps and end flaps through the table slot with a portion of the blank below and a portion of the blank disposed above the table, means for feeding packages along said table at right angles to the blank, forms above and below the path of movement of the packages, and means engageable with the blank and movable in paths substantially parallel to the path of travel of the packages over the forms for folding the blank over said forms prior to engagement of the blank by the packages.

6. In a package boxing machine, a slotted table, means for feeding a box blank having side flaps and end flaps through the table slot with a portion of the blank below and a portion of the blank disposed above the table, means for feeding packages along said table at right angles to the blank, forms above and below the path of movement of the packages, and reciprocable means movable in paths substantially parallel to the path of travel of the packages engageable with the blank for folding the blank over said forms prior to engagement of the blank by the packages.

7. In a package boxing machine, a slotted table, means for feeding a box blank having side flaps and end flaps through the table slot and for supporting the blank with a portion above and a portion below the table, means for feeding packages along the table to enclose the packages, reciprocatable means movable in paths substantially parallel to the path of travel of the packages operatable prior to the engagement of the packages with the blank for bending the blank along fold lines to enclose the advance end of the packages and to position the blank beneath and above the packages, means engageable with the side flaps of the blank as the blank and packages are fed along the table to fold and secure the side flaps against the packages, means engageable with the bottom end flap of the blank for bending said flap upwardly prior to positioning the bottom face of the blank beneath the package, means movable upwardly and against the end of the package for pressing and folding the bent bottom end flap against the package end, and means for folding the upper end flap downwardly over said bottom end flap folding means.

References Cited in the file of this patent

UNITED STATES PATENTS

| | | |
|---|---|---|
| 1,926,192 | Bromander | Sept. 12, 1933 |
| 1,964,122 | Johnson | June 26, 1934 |
| 2,307,076 | Ray | Jan. 5, 1943 |
| 2,512,382 | Ringler | June 20, 1950 |
| 2,609,646 | Total | Sept. 9, 1952 |
| 2,945,334 | Perrault | July 19, 1960 |